(12) United States Patent
Maciag

(10) Patent No.: US 8,105,172 B2
(45) Date of Patent: Jan. 31, 2012

(54) BEARING ASSEMBLY HAVING DEBRIS REMOVAL SYSTEM

(76) Inventor: Walter J. Maciag, Bay Village, OH (US)

( * ) Notice: Subject to any disclaimer, the term of this patent is extended or adjusted under 35 U.S.C. 154(b) by 2139 days.

(21) Appl. No.: 10/839,079

(22) Filed: May 5, 2004

(65) Prior Publication Data

US 2004/0209694 A1 Oct. 21, 2004

Related U.S. Application Data

(63) Continuation-in-part of application No. 09/436,592, filed on Nov. 9, 1999, now abandoned.

(51) Int. Cl.
*F16D 3/00* (2006.01)
(52) U.S. Cl. .......................... 464/132; 464/128
(58) Field of Classification Search .............. 464/128, 464/132, 136, 11; 384/905.1, 902, 279
See application file for complete search history.

(56) References Cited

U.S. PATENT DOCUMENTS

| | | | |
|---|---|---|---|
| 4,601,592 A | 7/1986 | Jatczak et al. | |
| 4,758,202 A | 7/1988 | Maciag et al. | |
| 4,967,705 A | 11/1990 | Maciag et al. | |
| 5,002,798 A | 3/1991 | Donley et al. | |
| 5,704,718 A * | 1/1998 | Mori et al. | 384/902 |
| 6,179,470 B1 | 1/2001 | Huddleston et al. | |
| 6,196,726 B1 | 3/2001 | Newberg et al. | |
| 6,270,259 B1 | 8/2001 | Burton | |
| 2003/0180538 A1 | 9/2003 | Gray | |

FOREIGN PATENT DOCUMENTS

| | | |
|---|---|---|
| GB | 2 117 088 A | 10/1983 |
| WO | WO 86/00380 A | 1/1986 |

OTHER PUBLICATIONS

Walter J. Maciag and Mark A. Mushenski, New Bearing Design Concept, an Innovative, U.S. Army, Design Concept for Tactical Vehicle Bearings and Universal Joints, SAE Report 973178, 1997, pp. 1-10.
Shell Retinax® Greases CMX and SDX, Multipurpose Lithium complex grease with moly for construction, mining and agricultural equipment, SOC: 1061-12/02.
Walter J. Maciag and Mark A. Mushenski, Investigation of Bearing Technology, Tardec Technical Report No. 13753, Aug. 1998.

* cited by examiner

*Primary Examiner* — Aaron Dunwoody
(74) *Attorney, Agent, or Firm* — Rankin Hill & Clark LLP

(57) ABSTRACT

A bearing assembly includes a rotatable hub defining a load transfer surface. A porous bearing surrounds and is movable relative to the hub. The bearing includes bearing surfaces extending radially toward the hub. A grease is disposed between the porous bearing and the hub. The grease includes a grease base oil and functions as a lubricant between the hub and the bearing. The grease generally maintains separation between the transfer surface and the bearing surfaces while simultaneously removing debris from an area defined between one of the bearing surfaces and the transfer surface. A bearing base oil is impregnated in the porous bearing and is substantially similar to the grease base oil for replenishing the grease base oil as the grease base oil is depleted.

25 Claims, 9 Drawing Sheets

BEARING ASSEMBLY HAVING DEBRIS REMOVAL SYSTEM

This application is a continuation-in-part application of U.S. patent application Ser. No. 09/436,592 filed Nov. 9, 1999, now abandoned, which is hereby expressly incorporated herein by reference.

BACKGROUND OF THE INVENTION

1. Field of the Invention

The present invention relates to a bearing assembly and, more particularly, to a self-lubricating bearing assembly having a debris removal system that improves the performance and/or life of the bearing assembly by removing debris, i.e., wear particles generating during normal bearing operation. The improved bearing assembly finds particular application in a power transmission device which includes trunnion and bearing sets for interconnecting and transferring power from a driving shaft of a power generating unit to a driven shaft of an operating unit and will be described with particular reference thereto. However, it is to be appreciated that the invention may relate to other similar environments and applications.

2. Description of the Prior Art

The mechanical transmission of power normally requires a transfer device which couples a power generating unit (source) to an operating unit in order to perform a mechanical function. The transfer device simultaneously couples the two units and transfers power between them. Often, shafts are used in power transmission assemblies and are joined by the transfer device for rotational and/or reciprocating energy transfer. This arrangement is often referred to as a "drive shaft" and the transfer device within the drive shaft arrangement is commonly called a "universal joint" where four (4) trunnions are utilized and a "tripot" where three (3) trunnions are used. Sometimes, however, the name "universal joint" is used more broadly to refer to any power transfer device regardless of the number of trunnions. A three trunnion tripot can also be referred to as a "constant velocity" joint. A typical drive shaft arrangement will normally utilize two universal joints whereas a "drive line" may use in excess of two universal joints and shafts. Many conventional passenger vehicles employ one drive shaft arrangement having two universal joints whereas many four-wheel drive vehicles and industrial/utility vehicles often employ two or more drive shaft arrangements or drive lines.

Universal joints function to (a) transmit a high starting or high stopping torque, including a reversal of direction of rotation, (b) maintain a continuous transfer of power at either constant or varying drive shaft revolutions, and (c) maintain a maximum power transfer between the power source and the operating unit or units during all relative drive line angles and length variations and vibrations. A common universal joint in use today is that which is sometimes referred to as the Hooke universal joint. In the Hooke joint, the driving and driven shafts are each provided with a yoke, the respective yokes are interconnected by a cross comprised of trunnion-bearing sets. A plurality of transfer surfaces, each essentially cylindrical in shape, are ground at the respective trunnions of the cross. Each trunnion transfer surface is adapted to receive a bearing member or cup which is provided internally with a plurality of needles. Crosses with four (4) transfer surfaces (trunnions) are in widespread use in rear wheel drive (RWD) and industrial vehicle drive shafts. They are also in widespread use in four wheel drive (4WD) vehicles. Tripots with three (3) transfer surfaces (or trunnions) are in widespread use in front wheel drive (FWD) and all-wheel drive (AWD) vehicles.

By introducing needles (cylindrical rollers) that roll, the transfer surfaces are separated from bearing surfaces of the bearing cups to avoid direct contact, greatly improving the relative movement of the transfer and bearing surfaces. The needles serve the function of transferring and maintaining the transmission of torque forces between the bearing cup and the trunnion. However, the universal joint needles are subjected to unusually high pressures which are transferred to the bearing cup surfaces at the area of their contact. The torque pressures often encountered in power transmission devices of conventional vehicles are normally in the 200 to 500 foot-pound range. These torque pressures translate into extremely high psi (pounds per square inch) pressures at the contacting surface. For needle rollers, the pressures range between 200,000 to 2,000,000 psi because of the small contact area (essentially a line). The pressures are orders of magnitude greater for ball bearings which essentially support the torque loads at a point area.

There are several drawbacks associated with the use of needles in bearing assemblies, particularly bearing assemblies used in drive shaft arrangements. One drawback is that, unless periodically lubricated, the bearing assembly will wear and deteriorate so significantly that the bearing member and/or the member (such as a trunnion) having the load transfer surface will require replacement. In a universal joint, this would require replacement of the entire universal joint kit including the bearing cup and the trunnion. Such wear is caused by the normal rolling action between the bearing and the load transfer surface. The relative movement or rolling action causes friction and heat which dries out the lubricant thereby causing the generation of deleterious debris (wear particles), typically 25-50 microns in diameter. As wear continues, the quantity and size of the debris increases. The continuously increasing quantity and size of debris can lodge at the needles causing them to slide rather than roll. This results in the creation of grooves called brinnels, which further restrict the rolling and increase friction, generating more and larger debris. Lack of proper lubrication maintenance accelerates the generation of wear debris. Thus, frequent lubrication and possibly bearing assembly replacement can be required in bearing assemblies employing needles. Frequent lubrication and periodic bearing replacement add an undesirable maintenance cost to the needle using bearing assembly that is necessary to ensure acceptable performance.

Another drawback is that when the bearing assembly with needles is subjected to sudden impacts, the needles transmit extremely high pressure shocks to the bearing and the member having the load transfer surfaces. In the case of a universal joint, sudden impacts to the bearing assembly can be introduced by road pot-holes or off-road vehicle usage and the high pressure shocks are transmitted to the bearing cup and trunnion surfaces. The needles, due to their small contact area (essentially a line), amplify the pressure transmitted which frequently results in a breakdown of the bearing surfaces causing generation of deleterious debris commonly referred to as "galls". These galls are initially small in size, typically 50-75 micron in diameter. However, they, like the debris causing brinneling, increase in quantity and grow larger over time. In the case of debris that causes brinneling or gall-type debris, once the debris or wear particles within a bearing assembly are larger than about 100 microns, which indicates that wear is progressing rapidly, the bearing assembly should be replaced to avoid complete bearing failure. Should the wear particles exceed about 150 microns in size, bearing failure in the form of surface seizure, is likely to be imminent.

Yet another drawback related to the use of needles in bearing assemblies is the cost factor in manufacturing the needles as additional components of the bearing assemblies and the cost of assembling the needles in a bearing assembly. For example, in the manufacture of universal joints, bearing assemblies having needles are more expensive due to the manufacturing cost of the needles, the cost of assembling the needles in the trunnion and bearing sets of the universal joint and the cost of the required assembly equipment.

Still another drawback of using needles in bearing assemblies is related to the means for enabling periodic lubrication of the bearing assembly. Often, lubricant is used in the area between or adjacent the bearing surfaces and the load transfer surface of the member surrounded by the bearing to provide lubrication as the bearing rolls about the force transfer surface. Heretofore, the means for enabling periodic lubrication of the bearing assembly was a fitting formed as part of the bearing assembly. In a universal joint, the fitting is connected to a channel for each trunnion for purposes of delivering and distributing lubricant forced into the fitting to each of the bearing-trunnion engagement areas. Alternatively, reservoirs drilled into components of the bearing assemblies are sometimes utilized for holding an amount of lubricant suitable for replenishing that which is depleted during normal bearing usage. In either arrangement, the manufacturing costs of the bearing assembly is undesirably increased when such means for enabling periodic lubrication can be incorporated in the bearing assembly.

It is recognized that many other types of bearings operate in non-power transmission situations, e.g., support bearings utilizing roller members, such as needles or balls, supporting a rotating shaft. Another class of support bearings operate without rolling members and are commonly referred to as plain or sliding bearings. Typically, these latter types of bearings rely on sliding movement (as opposed to rolling movement) and either an oil or a non-solid grease to lubricate or facilitate relative movement. One type of non-roller bearing uses oil which is continuously delivered to the surfaces of the bearing by a groove in one of the bearing surfaces. This type of bearing must operate at very high speeds (circa 10,000 rpm) so that the oil can create a hydrostatic film with sufficient force to prevent the load transfer surface and the bearing surfaces from making direct and often metal-to-metal contact. Direct contact leads to friction causing excessive heat and wear, as well as eventual seizure. Fully rotational, constant high speed is required to maintain the film. There is no mechanism for removing wear debris after it is generated in these types of bearings. Moreover, power transmission bearings, including universal joint bearings, are oscillatory at constantly varying speeds which would not permit a film to be generated. Thus, these types of bearings are typically unsuitable for use in power transmission bearing assemblies.

Another type of non-roller prior art bearing relies on various viscosity greases to separate bearing surfaces from load transfer surfaces. The grease is applied to one of the bearing and load transfer surfaces. It has been established by bearing design tribologists that the maximum practical limit of PV (psi-sfm) of this type of bearing is approximately 50,000. PV is a measure of the performance capability of a sliding bearing. P is a measure of pressure on the bearing's surface in pounds per square inch (psi), while V is a measure of the velocity of the bearing's surface in surface feet per minute (sfm). The product of the two, PV, is a indication of the performance capability of the bearing. The PV rating is sensitive to the composition of the materials of the contacting surfaces. Materials chosen for speed (high sfm), V, sacrifice their ability to support load capacity, P. Polymer materials (Polycarbonates, Acetais, Nylon) whose PVs approximate 3,000, with a maximum P of 1,000 psi, fall into this class. Metals permit higher load carrying with PVs ranging from 20,000 to 50,000. Those with low coefficients of friction (i.e., higher lubricity) which include carbon graphite, bronze, tin-bronze, aluminum-bronze, are still limited by the maximum speed permitted, typically under 300 sfm. Conventional bearings fabricated with powdered metals typically operate in the 15,000 to 50,000 PV range. The best performance has been received by PM bearings referred to as porous iron and porous bronze, whose maximum PVs are 30,000 and 50,000, respectively.

Generally, prior art bearings were not designed for removing debris between bearing surfaces and the load transfer surface. Rather, prior art bearings focused on the delivery of liquid lubricants to prevent surfaces from rubbing and generating wear particles. Thus, there is a need for an improved bearing assembly that reduces and/or eliminates the amount and size of deleterious debris or wear particles generated during normal use of the bearing assembly, removes any generated debris from between the bearing surfaces and the load transfer surface, has an increased useful performance life, has increased performance capabilities, and has decreased costs related to the manufacture and maintenance of the bearing assembly.

SUMMARY OF THE INVENTION

The present invention provides a new and improved bearing assembly that overcomes the foregoing difficulties and others and provides the aforementioned and other advantageous features. More particularly, in accordance with one aspect of the present invention, the bearing assembly includes a rotatable hub defining a load transfer surface. A porous bearing surrounds and is movable relative to the hub. The bearing includes bearing surfaces extending radially toward the hub. A grease is disposed between the porous bearing and the hub. The grease includes a grease base oil and functions as a lubricant between the hub and the bearing. The grease generally maintains separation between the transfer surface and the bearing surfaces while simultaneously removing debris from an area defined between one of the bearing surfaces and the transfer surface. A bearing base oil is impregnated in the porous bearing and is substantially similar to the grease base oil for replenishing the grease base oil as the grease base oil is depleted.

In accordance with another aspect of the present invention, a bearing assembly includes a rotatable hub defining a load transfer surface and a bearing surrounding and movable relative to the hub. The bearing includes bearing surfaces extending radially toward the hub. A pressure resistant grease is disposed between the hub and the bearing. The grease functions as a lubricant between the hub and the bearing that generally maintains separation between the transfer surface and the bearing surfaces while simultaneously removing debris from between one of the bearing surfaces and the transfer surface.

In accordance with still another aspect of the present invention, a bearing assembly includes a rotatable hub defining a load transfer surface and a porous bearing surrounding and movable relative to the hub. The bearing includes bearing surfaces extending radially toward the hub. A pressure resistant grease is disposed between the porous bearing and the hub. The grease includes a grease base oil for lubricating movement between the bearing surfaces and the load transfer surface. A bearing base oil is impregnated in the porous bearing and is substantially similar to the grease base oil for replenishing the grease base oil as the grease base oil is depleted.

In accordance with still yet another aspect of the present invention, an improved universal joint is provided. More particularly, in accordance with this aspect of the present invention, the universal joint includes a driving shaft having a driving yoke and a driven shaft having a driven yoke. A cross member and a plurality of bearing members interconnect the driving yoke and the driven yoke. Each of the bearing members is connected to a respective one of the yokes. The cross member is provided with a plurality of trunnions and one of said plurality of bearing members is provided for each of said plurality of trunnions. Each trunnion and associated bearing form a bearing assembly that includes a transfer surface defined on the trunnion that is surrounded by the bearing member. The bearing member includes a plurality of bearing surfaces which are integral therewith. Optionally, the bearing surfaces are semi-trapezoidal or semi-circular in cross section. The bearing surfaces make bearing contact with the transfer surface through a film of relatively incompressible grease. The bearing surfaces and the grease facilitate removal of debris between the bearing surfaces and the transfer surface by maintaining a flow of grease across the surfaces by the rotation of the transfer surface.

The bearing member is preferably fabricated using powder materials techniques and powdered materials which advantageously form the integral bearing surfaces and shapes within the bearing member, thereby eliminating the necessity for the use of balls, needles or other rolling members with the bearing member. Moreover, using powder materials techniques and powdered materials, the bearing member is at least partially porous and can be impregnated with a base oil that is suitable for replenishing a grease base oil of the grease as the grease base oil is depleted.

BRIEF DESCRIPTION OF THE DRAWINGS

The invention may take physical form in various components and arrangements of components, and in various steps and arrangements of steps. The drawings are only for purposes of illustrating preferred embodiments of the invention and are not to be construed as limiting the invention.

DETAILED DESCRIPTION OF THE INVENTION

Figures 1A, 1B:
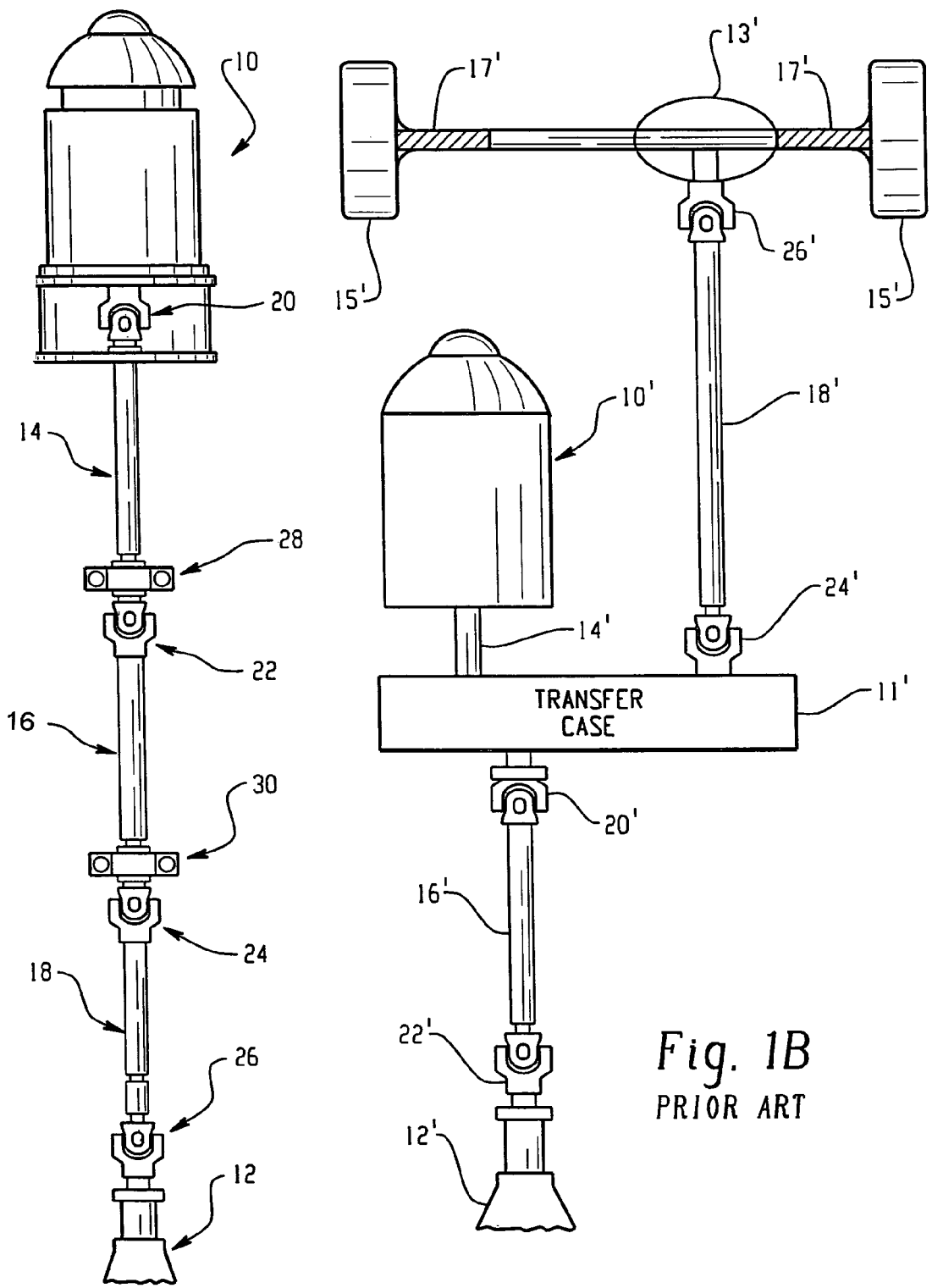
FIG. 1A is a schematic view of a drive line showing the incorporation of four universal joints therein.
FIG. 1B is a schematic view of a drive line showing the incorporation of four universal joints and two constant velocity joints.

With reference to FIG. 1A, a drive line interconnects a power source and an operating unit. The drive line of FIG. 1A is the type often employed in a conventional rear-wheel drive vehicle. The power source in FIG. 1A is identified by reference numeral 10 and may be in the form of an electric motor, internal combustion engine or other power producing device. The driven or operating unit is designated by reference numeral 12. The drive line interconnects the power source 10 with the operating unit 12 and is defined by a plurality of drive shafts 14,16,18. Universal joints 20,22,24,26 provide for an interconnection of the respective drive shafts 14,16,18 with one another as well as with the power source 10 and the operating unit 12. Thus, the universal joints perform a coupling function for the transmission of power from one member to another. Center shaft support bearings 28,30 are used to support the drive line, as is known in the art.

With additional reference to FIG. 1B, another drive line is shown interconnecting a power source 10' and operating units 12', 13'. The drive line of FIG. 1B is the type often employed in conventional four-wheel drive vehicles in that it utilizes universal joints to drive rear wheels of the vehicle and constant velocity joints to drive front wheels of the vehicle. In many respects, the drive line of FIG. 1B is like the drive line of FIG. 1A. Both transmit power from a power source, such as in internal combustion engine, to one or more operating units or loads. More specifically, the drive line of FIG. 1B interconnects the power source 10' and the operating units 12', 13' through a transfer case 11'. Driveshaft 14' connects the power source 10' directly with the transfer case 11', whereas universal joints 20',22' connect the transfer case 11' with the operating unit 12' through driveshaft 16' and universal joints 24', 26' connect the transfer case 11' with the operating unit 13' through driveshaft 18'. The operating unit 13' transfers torque to front wheels 15' through constant velocity joints 17'.

Figure 2:
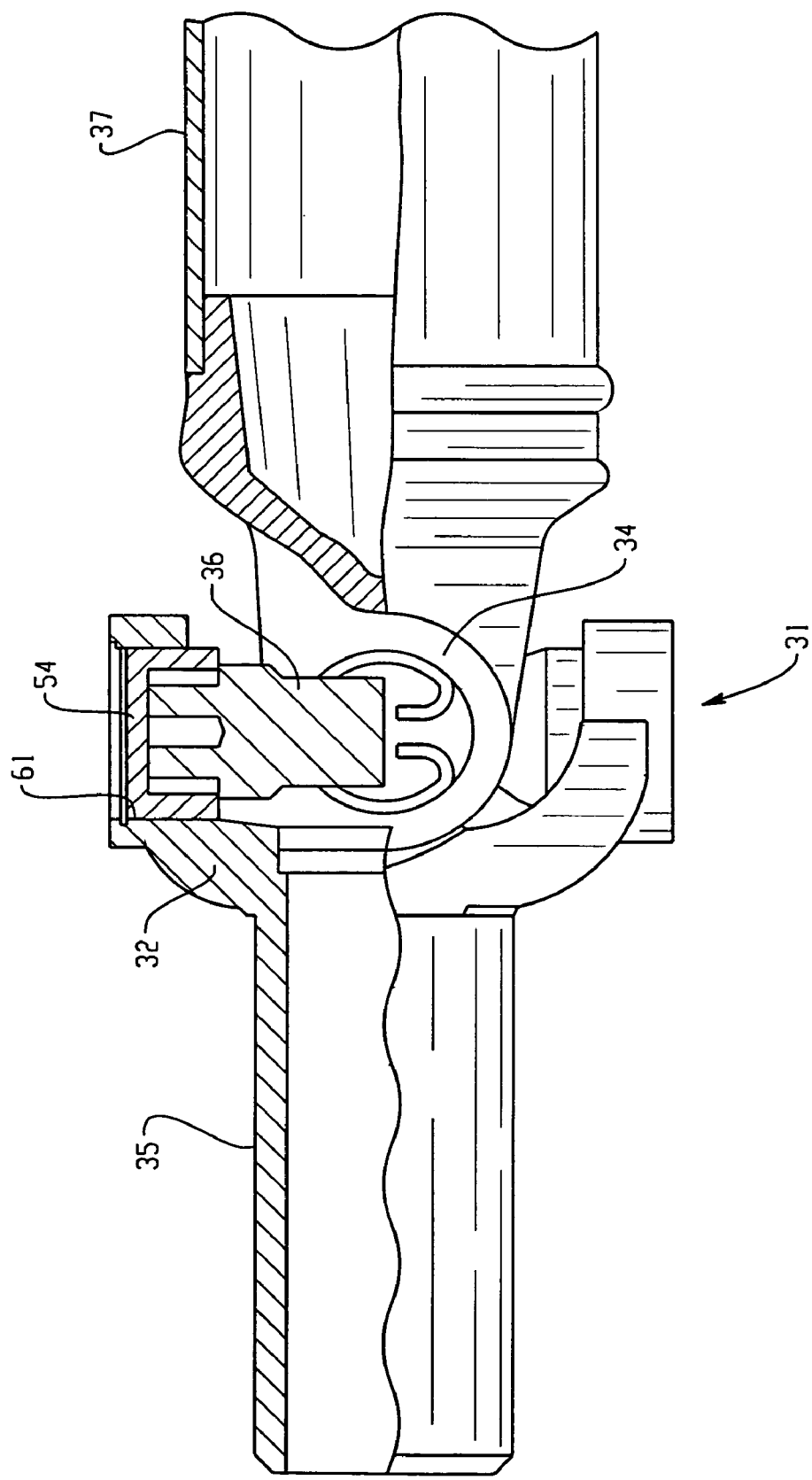
FIG. 2 is an elevational view, partly in section, showing a prior art universal joint incorporating four trunnions and bearing cup sets.
Figure 3:
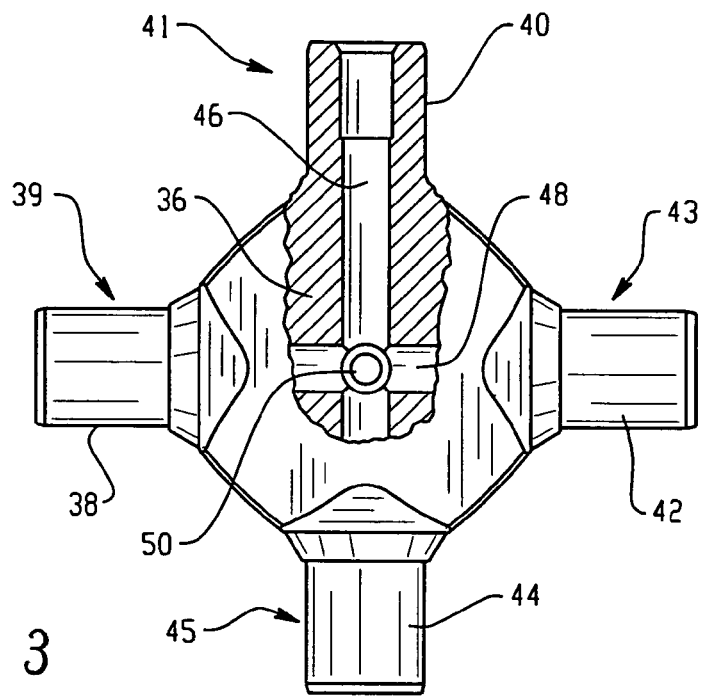
FIG. 3 is a top elevational view, partly in section, showing a prior art cross.

In FIG. 2, a prior art universal joint 31 is shown which could be employed as one of the universal joints of FIG. 1A or 1B. In FIG. 2, drive shafts 35,37 are connected to one another by the universal joint 31. The drive shaft 35 includes a yoke 32 that is connected to a yoke 34 of the drive shaft 37 by means of a cross 36 and bearing members 54. With additional reference to FIG. 3, the cross 36 is a four trunnion load transfer element defined by trunnions 39, 41, 43, 45 and by essentially cylindrical transfer surfaces 38, 40, 42, 44 which are ground or otherwise defined by the respective trunnions. Drilled cross passages 46, 48 are provided internally of the cross 36 to define lubricant passageways for feeding lubricant from a fitting 50 which is a grease fitting or the like. Lubricant is fed from the fitting 50 through passages 46, 48 out to the transfer surfaces 38, 40, 42 and 44, as may be seen in FIG. 3. The lubricant passageways and fitting are provided for the purpose of enabling lubricant to be fed to the roller needles 60 (FIG. 4) positioned within the bearing member 54 as will be described below.

Figure 4:
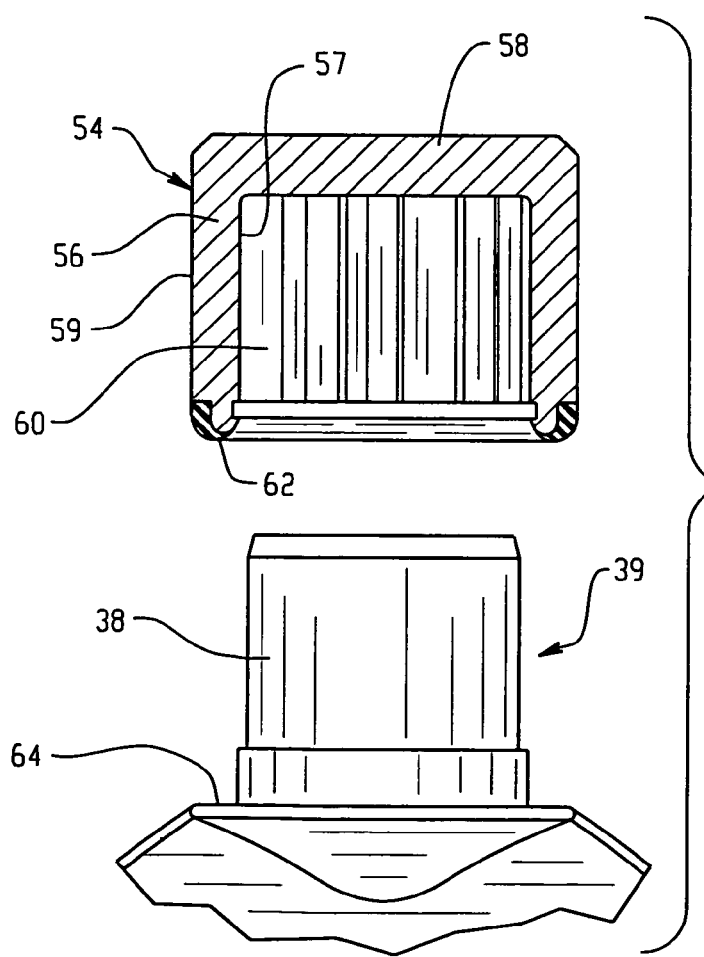
FIG. 4 is an elevational exploded view, partly in section, showing a prior art bearing cup with an associated transfer surface of a prior art trunnion.

With reference to FIG. 4, the bearing member 54 is generally cup-shaped and includes a generally cylindrical sidewall 56, a generally cylindrical inner wall 57, a closed end 58 and an exterior surface 59. A plurality of roller needles 60 are positioned within the bearing cup 54 circumferentially around the internal or inner wall 57 thereof. A seal 62 is provided in the form of a skirt depending from the bearing cup 54. The seal 62 serves the purpose of retaining lubricant within the bearing cup 54. When the bearing member 54 is installed on a trunnion, such as trunnion 39, the roller needles 60 make contact with the transfer surface 38 of the trunnion 39. The seal 62 contacts surface 64 of the trunnion 39 and affords sealing of the internal annular chamber in which the roller needles are positioned. It can, thus, be appreciated that with reference to FIGS. 3 and 4, lubricant is fed from the fitting 50 through passages 46, 48, and is directed into the bearing cup 54 where it is retained to afford lubrication for the roller needles 60. With reference back to FIG. 2, the bearing cup 54 is received within one of the yokes 32, 34 thus providing an interconnection between the yoke and the trunnion. The transmission of torque through the universal joint of FIG. 2 is accomplished at the transfer surfaces of the cross, the bearing cups and yokes. Specifically, such transfer surfaces are designated 38, 40, 42 and 44 in the cross, 57 and 59 in the described bearing cup 54 and 61 (FIG. 2) in the yoke 32 to which the bearing cup 54 is fixed.

Figure 5:
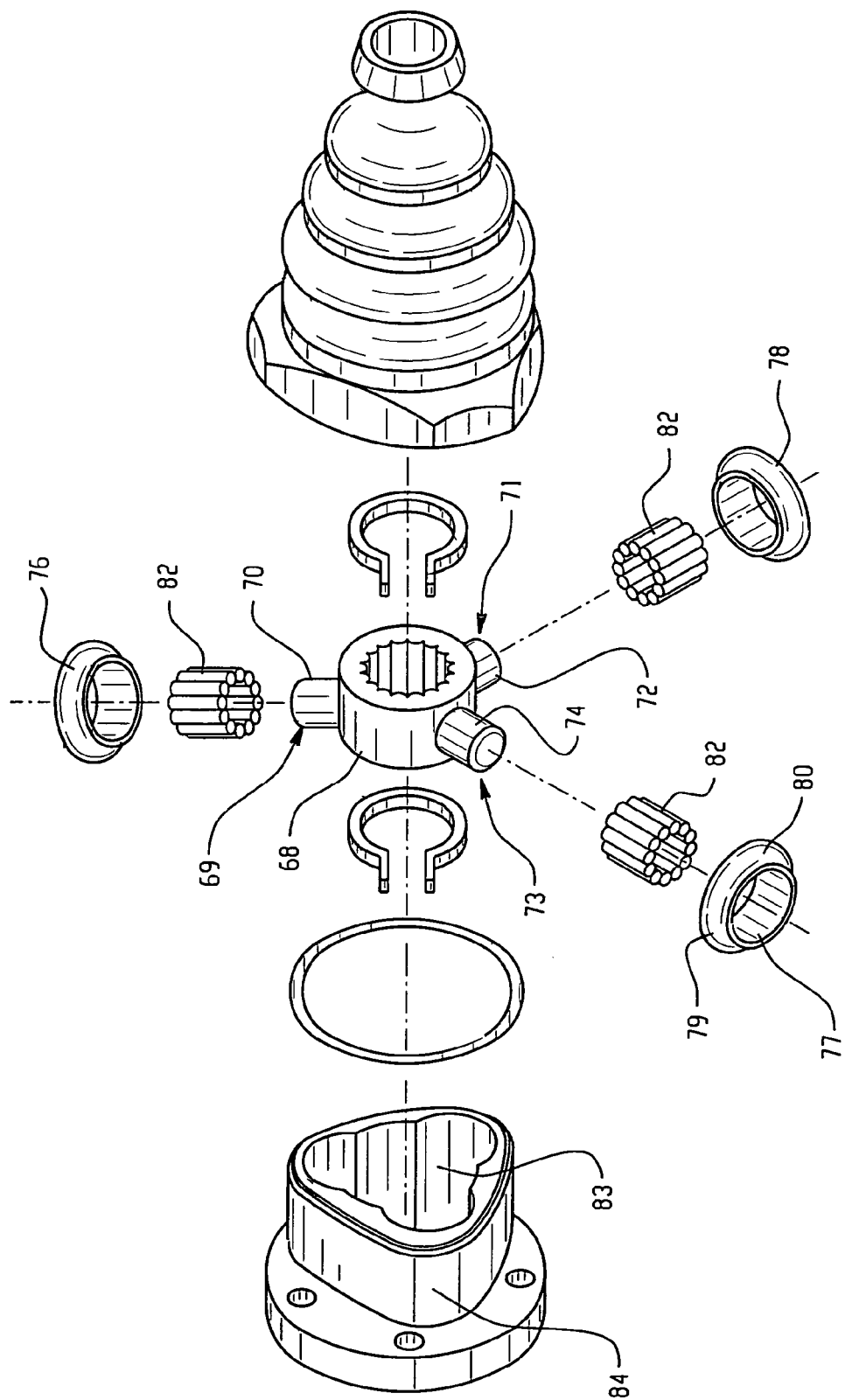
FIG. 5 is an elevational exploded view showing a three trunnion prior art tripot.

With reference to FIG. 5, another prior art universal joint is shown that is suitable for use in a front wheel drive vehicle. The universal joint of FIG. 5, also referred to as a tripot, includes a tripot member having three trunnions 69, 71 and 73 which define transfer surfaces 70, 72 and 74. Bearing members 76, 78, 80 are associated with each of the respective transfer surfaces of the trunnions. The bearing members 76,78,80 of FIG. 5 are sometimes referred to as through cups for the reason that the bearing members 76,78,80 are each open at both ends and do not include the transverse wall such as is shown at 58 in FIG. 4. Like the bearing member 54 of FIG. 4, a plurality of needles 82 are received in each of the bearing members 76,78,80 and are adapted to contact the transfer surfaces 70, 72 and 74 of the tripot of FIG. 5. Each of the needles are retained by the respective bearing cups 76, 78, 80. The bearing cups, in turn, are received within the housing 84. The transmission torque through the tripot of FIG. 5 is accomplished at the transfer surfaces of the tripot member, the bearing cups and the housing. Specifically, such transfer surfaces are designated 70, 72 and 74 in the tripot, 77 and 79 in the through cups 76, 78 and 80 and 83 in the housing 84.

The transfer devices of FIG. 2 (universal joint) and FIG. 5 (tripot) both require the use of roller needles and grease to reduce friction, thereby accommodating the relatively small movement between the bearing cup and the trunnion transfer surfaces. The needles further transfer and maintain torque forces between the bearing cup and the trunnion transfer surfaces. As discussed in more detail above, the use of needles in bearing assemblies has several drawbacks including (i) the need for periodic lubrication and/or replacement; (ii) rapid bearing wear due to impact or pressure shocks to the bearing assembly; (iii) manufacture and assembly costs of needles; and (iv) requirement of more complex part designs for enabling periodic lubrication of the needles.

These drawbacks in combination with the recognition by the applicant of the limited relative movement between the bearing member and the trunnion while in use resulted in the examination of various structurally shaped transfer surfaces of the trunnion, the bearing member, and the trunnion and bearing member, in combination, for purposes of eliminating the use of roller needles in bearing assemblies, including universal joints. With reference to FIG. 2, the recognition of the limited relative movement between the bearing member and the trunnion will be more fully described by example. In operation, a single rotation of the shaft 35 will produce a single rotation of shaft 37. The cross 36 of the universal joint between the shafts 35,37 also makes a single complete rotation. However, the relative movement between the trunnion transfer surfaces and the needle rollers as the cross 36 rotates is determined by the angle between the shafts 35 and 37. That is to say, while the shafts 35,37, along with the interconnecting universal joint, rotate as a unit, there is, within the bearing cup 54, little relative movement between the roller needles and the transfer surfaces of the trunnion, particularly if the angle between the shafts 35,37 is zero. Thus, in normal driveline operation there is angularity and/or longitudinal displacement between the shafts 35 and 37. The movement between the bearing cup 54 and the trunnion of the cross 36 is aperiodically oscillatory either in the longitudinal and/or the radial direction.

Figure 6:
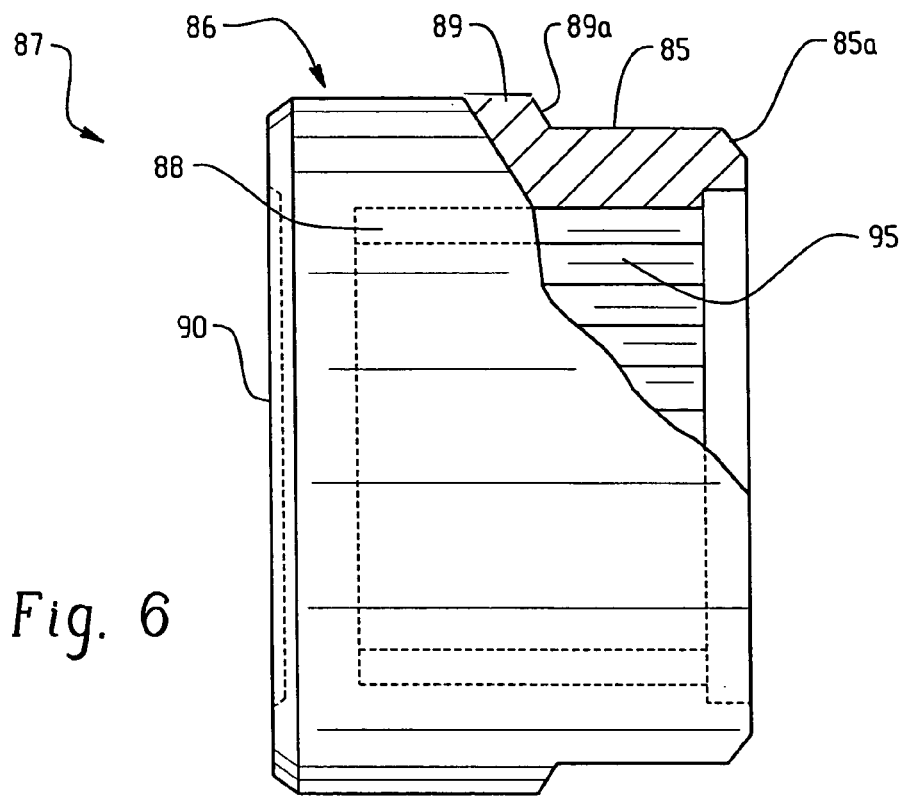
FIG. 6 is a side elevational view, partly in section, of a bearing member according to a preferred embodiment of the present invention.
Figure 7:
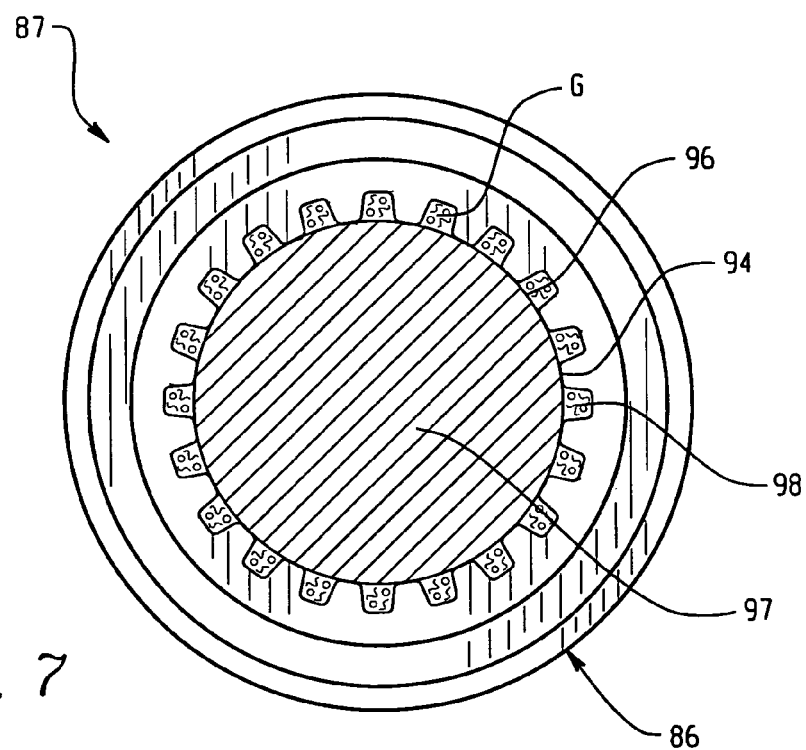
FIG. 7 is an end elevational view of the bearing member of FIG. 6 showing, in section, the transfer surface of a trunnion associated therewith.

FIGS. 6 and 7 show a bearing assembly according to a preferred embodiment of the present invention generally designated by reference numeral 87. As will be described in more detail below, the bearing assembly 87 includes a bearing member 86 having bearing surfaces 95 and being at least partially porous due to being produced using powder metallurgy or materials techniques. The bearing surfaces 95 can be integrally formed with the bearing 86 or, alternately, formed by plating, electro-deposition, or any other conventional forming method. The bearing assembly 87 further includes a rotatable hub 97 defining a load transfer surface 96. The bearing 86 surrounds and is movable relative to the hub 97. As used herein, rotatable is defined simply as to turn about an axis. Thus, rotatable can be used to describe movement of the hub 97 that includes full revolutions, partial revolutions, oscillating movements and the like. As will also be described in more detail below, a grease G is disposed between the bearing 86 and the hub 97 and a base oil (not shown) is impregnated within the porous portion of the bearing 86.

The transfer surface 96 is generally a cylindrical surface which is ground or otherwise defined on the circumference of the hub 97. In the illustrated embodiment of FIGS. 6 and 7, the bearing 86 is in the form of a cup and may alternatively be referred to herein as a bearing cup and the hub 97 is a trunnion of a universal joint. Although the illustrated embodiment primarily shows a bearing assembly for use in conjunction with or as part of a universal joint, it should be appreciated by those skilled in the art that the present invention is readily usable in a wide range of bearing applications and need not to be limited to universal joints. Moreover, as used herein, hub should be broadly construed to include shafts, reciprocating surfaces and the like.

The bearing cup 86 is defined by an essentially cylindrical sidewall 88 having a closed end 90, a first cylindrical outer surface 89 adjacent the closed end 90 and a second cylindrical outer surface 85 axially spaced from the closed end 90. The outer surface 89 has a first diameter and the outer surface 85 has a second diameter that is slightly less than the first diameter of the outer surface 89. A frustoconical or tapered surface 89*a* connects the first outer surface 89 to the axially spaced second outer surface 85 and a lead taper 85*a* is defined at or adjacent a distal end of the outer surface 85 for facilitating easier access and better alignment of the bearing cup 86 into a yoke of a driveshaft. This feature is an element of this invention and is referred to as a "lead-in". The surface 85, being of smaller diameter than the securing yoke diameter, permits the bearing cup 86 to be easily inserted into the yoke without misalignment damages. It eliminates the misalignment between the yoke's diameter and the bearing cup's outer diameter 86 when the insertion is completed.

The bearing surfaces 95 are raised landings defining an inner surface 94 of the bearing member 86 and are separated by pockets or recesses 98 recessed or extending radially into the inner surface 94. In the embodiment of FIG. 7, the bearing member landing surfaces 95 are defined as segments of the cylindrical surface 94 having a land width of approximately 0.030 inches. Thus, the raised landings 95, which are contiguous and integral with the bearing member 86 and its sidewall 88, alternate around the circumference of the inner surface 94 with the recesses 98 and extend radially inwardly toward the load transfer surface 96 of the trunnion 97. The landings 95, thus, substitute for the prior art roller needles insofar as their interaction with the transfer surface 96. Eliminating the need for needles in the bearing assembly 87 reduces manufacturing costs of the bearing assembly, including intensive labor costs related to installing needles in the bearing member. Since the bearing member inner surface 94 is integral with the cup 86, there can be no relative rotation between the bearing member landing surfaces 95 and the bearing member inner wall 94. Preferably, the bearing surfaces 95, also referred to herein as contact landing surfaces and bearing member landings, are generally semi-trapezoidal shaped in cross section. Also preferably, the bearing surfaces 95 extend axially from approximately the open end of the bearing cup 86 throughout substantially the entire depth of the cup 86 to the closed end wall 90. In one preferred embodiment, the bearing 86 includes twenty (20) landings 95 separated by twenty (20) recesses. However, as will be obvious to those skilled in the art, other numbers of landings and recesses could be employed.

The rectangular area surfaces 95 of the bearing member 86 replace the line contact area surfaces between prior art roller bearings having needles and the load transfer surface 96. This significantly reduces the effect of impact and normal loads by distributing the load pressures across the larger area of the landing's rectangular surface 95 and grease layer G resulting in lower contact psi (pounds per square inch). The psi pressures on the bearing member walls are reduced by factors in the range of 100-1000 over that of prior art rolling members. This improves considerably the fatigue resistance of the hub 97. While, thus far, the formation of the bearing surfaces has been described with reference to the bearing member 86, it should also be appreciated that this invention could include structures in which the bearing landing and pocket surfaces are defined on the load transfer trunnion element.

The grease G disposed between the bearing 86 and the hub 97 functions as a lubricant between the load transfer surface 96 of the hub 97 and the contact landing surfaces 95 of the bearing member 86. The grease G is preferably pressure resistant or compressive resistant and maintains separation between the load transfer surface 96 and the contact landing surfaces 95. Moreover, as will be described in more detail below, the grease G simultaneously removes generated debris from between the load transfer surface 96 and each of the contact landing surfaces 95 so as to decrease wear on these surfaces. As will also be described in more detail below, the grease G comprises a grease base oil that is a component of the grease G that lubricates movement between the load transfer surface 96 and the contact landing surfaces 95.

In a preferred embodiment, the grease G is able to operate normally at high temperatures which enables the grease G to operate without losing its flow or lubricity characteristics, i.e., the grease base oil does not "bake out" of the grease G when operating at high temperatures. In universal joints, for example, normal operating temperatures are between about 100° F. to 175° F. so the preferred grease G is able to operate normally at temperatures in excess of about 175° F. While being able to operate at high temperatures, the grease G should also provide sufficient pressures (be compressive resistant) to separate the contact landing surfaces 95 from the load transfer surface 96 while simultaneously exhibiting flow characteristics that permit removal of wear particles or debris by wiping across these surfaces 95,96. These characteristics are found in a class of special solid, inorganic compounds called calcogenides and, according to a preferred embodiment of the present invention, the grease includes a calcogenide component.

Calcogenides are a family of binary compounds comprised of atomic, laminar flow planes. Members of the calcogenide family include molybdenum disulfide ($MoS_2$), tungsten disulfide ($WS_2$), molybdenum diselenide ($MoSe_2$), tungsten diselenidie ($WSe_2$) and others. In the preferred embodiment, the calcogenide compound of the grease G is molybdenum disulfide ($MoS_2$). In addition, the grease G preferably includes lithium thickened complex soap and the grease base oil is an ISO 320 viscosity grade (mid-range) paraffinic base oil. The $MoS_2$, when compounded with the lithium thickened complex soap and the base oil, has been found to, in addition to providing laminar flow to the grease G, exhibit extreme pressure resistance to penetration in the direction normal to its laminar planes. Thus, the grease G of the preferred embodiment is relatively incompressible and thereby maintains separation of the surfaces 95,96. The highest temperature at which the grease G of the preferred embodiment can be safely used, i.e., the grease's Drop Point, is about 450° F. which is considerably above the normal operating temperature range of most bearing assemblies and is certainly in excess of the normal temperature operating range of bearing assemblies employed in universal joints.

Preferably, the bearing member 86 is manufactured of powdered materials (PM) which exhibit a unique structural characteristic often referred to as porosity. Porosity is the percentage of void volume in a part. Thus, a part which is 85% dense will have a porosity of 15%. Porosity in a PM part can be present as a network of interconnected pores that extend to one or more surfaces of the part like a sponge. The bearing member 86 is able to be impregnated with a bearing base oil as a result of being porous in this manner. The specific porosity of the bearing member 86 indicates the amount of base oil that can be impregnated therein. For example, if the bearing member 86 has a porosity of 15%, then 15% of the bearing member's structure is oil content.

In one preferred embodiment of the present invention, the bearing member 86 is impregnated with a bearing base oil that is substantially similar to or compatible with the grease base oil which is a component of the grease G. Thus, if the grease base oil is an ISO 320 viscosity grade (mid-range) paraffinic base oil then the base oil is also an ISO 320 viscosity grade (mid-range) paraffinic base oil or some other substantially similar base oil. Matching the bearing base oil to the grease base oil allows for the grease base oil to be replaced or replenished by the bearing base oil should the grease base oil be depleted, such as sometimes occurs as a result of heating. Replacement or replenishment of the grease base oil occurs through capillary action. That is, the bearing base oil, which is impregnated or stored within pores of the bearing member 86, flows or moves out of the bearing member 86 and into the grease G as a result of capillary action. Replenishment or replacement of the base oil component of the grease G enables the grease to maintain its lubricous integrity.

Directly related to porosity is density. Density of a particular part is measured by the number of grams of the part per the cubic centimeter of the part (g/cc). Generally, impregnated bearings fall into three definable density ranges: (1) density range of about 5.0 to about 6.0 g/cc wherein the bearing base oil content is between about 20% and about 35% of the bearing; (2) density range of about 6.0 to about 6.4 g/cc wherein the bearing base oil content is between about 10% and about 20% of the bearing; and (3) density range of about 6.8 and about 7.3 g/cc wherein the bearing base oil content is under about 10% of the bearing. Although a lower density would allow the bearing member 86 to have a higher porosity and a higher amount of impregnated base oil for replenishing the grease G, it is highly desirable to minimize the need for the replenishing oil and thereby maintain a higher density bearing member 86. A higher density bearing member 86 has an increased load carrying capability and is much more resitance to impact shock loads. Moreover, the higher density bearing member 86 would intrinsically have a higher thermal conductivity which would enhance the bearing member's ability to remove heat from the bearing surfaces 95 and the grease G. Less heat in or near the grease G would reduce the amount of base oil baked out of the grease thereby further reducing the need for replenishment of the base oil. In the preferred embodiment, the bearing member 86 has a density between about 5 and about 7.5, preferably between about 6.5 and about 7.2, more preferably between about 6.8 and about 7.2, and most preferably about 7.

Preferably, a high carbon steel powdered material is used to form the bearing member 86 and the bearing member is fabricated using powder metallurgy or materials techniques and powdered materials. In one preferred embodiment, the bearing member 86 is composed of a ferrous compound, a nickel compound and a carbon compound. Of course, as is known to those skilled in the art, other materials can be used to form the bearing member 86, including, for example, other metals, ceramics, polymers, composites of these materials, and any combination thereof. The carbon compound adds some resilience to the bearing member 86 which decreases its brittleness. The powder materials techniques advantageously used to manufacture the various elements of this invention, employ three basic steps, i.e., mixing, compacting, and sintering. In mixing, elemental or pre-alloyed metallic or non-metallic powders, such as the compounds identified above, are first mixed with lubricants or other powder additions to produce a homogenous blend of ingredients. In compacting, a controlled amount of mixed powder is gravity fed into a precision die and is compacted at varying pressures and temperatures depending upon the density requirements of the part. In sintering, the compacted ingredients are caused to be passed through a controlled-atmosphere furnace. The part is heated to below the melting point of the base metal and held at the sintering temperature for a desired time before being cooled. After sintering, the part is impregnated with the bearing base oil. If greater precision in dimensional accuracy is required, the sintered part is machined, plated and/or heat treated. Alternatively, the bearing member 86 may also be fabricated using conventional machining/forming techniques such as drilling, broaching and the like. Impregnation of powder materials parts may be achieved by soaking the parts in heated oil or by vacuum techniques.

Alternately, the bearing member 86 can be formed to have a density that varies over a dimension thereof. For example, the bearing member 86 could be relatively more porous at or adjacent the landing surfaces 95 and relatively less porous (more dense) away from the surfaces 95. Another alternate embodiment impregnates a portion of the bearing member 86 spaced away from the surfaces 95 with an epoxy filler. These alternates utilize less base oil in impregnating the bearing member 86 while still providing sufficient base oil for replenishment of the grease G.

In operation, the bearing assembly of the preferred embodiment employs the grease G in combination with the structure of the bearing member 86 to remove generated debris from between the load transfer surface 96 and each of the contact landing surfaces 95. The rotation or oscillation of the hub 97 maintains a constant flow of the grease G across the surfaces 95,96 which pulls any generated debris from areas defined between the raised landings 95 and the load transfer surface 96 and lodges or deposits the pulled debris into one of the pockets or pocket receptacles 98. Such removal and deposit prevents or lessens wear and deterioration on the surfaces 95,96 caused by the debris.

By introducing a grease containing, inorganic, laminar, solids, most notably a solid whose atomic lattice structure also supports high psi (pounds per square inch) loads (e.g. calcogenides) while maintaining laminar integrity during the relative sliding of the contacting surfaces, debris removal and lubrication at the surfaces 95,96 occurs. Moreover, an uninterrupted flow of grease is supplied to the surfaces 95,96 as a result of the structural design shape of the pocket walls which serve as a continuously replenishing grease reservoirs and the relative movement between the trunnion and landing surfaces 95,96 caused either by oscillation or rotation. Maintenance of an uninterrupted flow facilitates a contiguous bond of laminar grease layers insuring its longevity and eliminates or at least reduces the need for replenishment.

More particularly, with reference to FIGS. 10A-10D, the grease G follows flow pathways 140, 141, 142 between the bearing member 86 and the load transfer surface 96 of the trunnion 97. Specifically, the flow pathways 140, 141, 142 are shown in relation to one of the raised landings 95a formed integrally with the bearing member 86. As will be discussed in more detail below, the contoured shape of the landing 95a results from the capabilities of powered metal methods of fabrication and maintains proper flow dynamics of the grease G so the relatively incompressible grease G can maintain separation of the surfaces 95,96 while removing debris from between these surfaces. The direction of flow pathways 140, 141, 142 shown in FIGS. 10A-10D results from or assumes counterclockwise rotation of the hub 97.

Figure 10A:
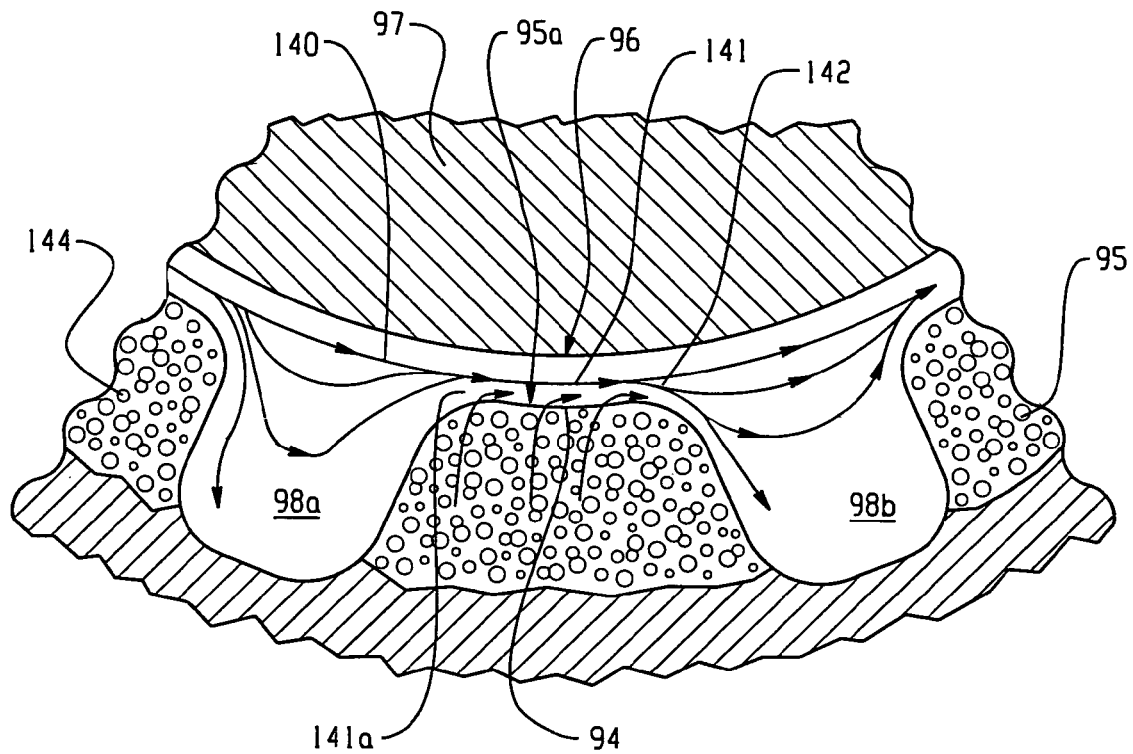
FIG. 10A is a partial enlarged view of the bearing member and trunnion of FIG. 7 showing a raised bearing surface or landing spaced relative to the transfer surface of the trunnion.
Figure 10B:
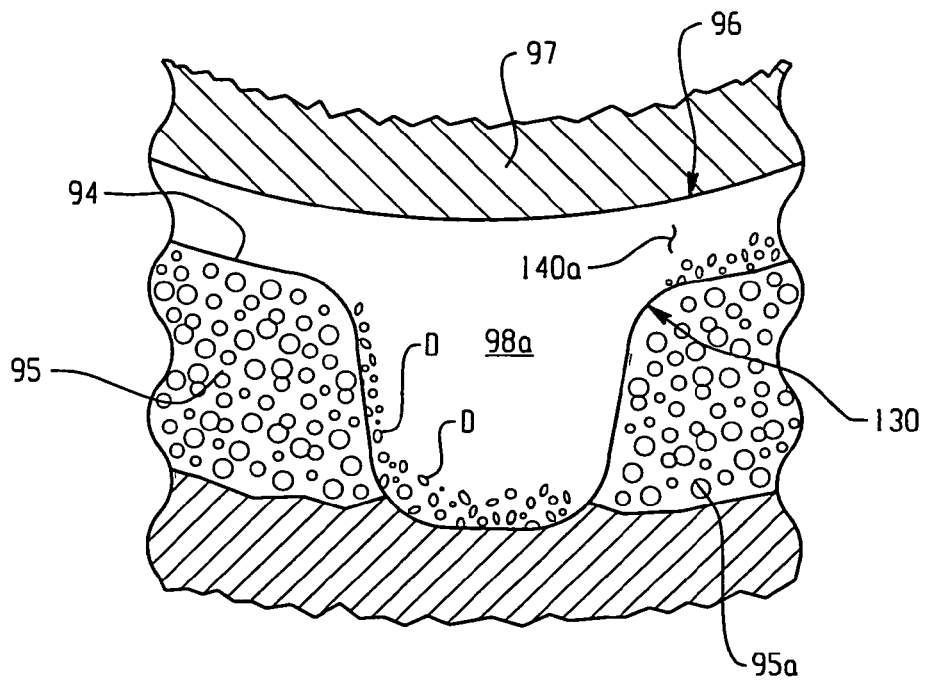
FIG. 10B is a partial enlarged view of the bearing member and trunnion of FIG. 7 showing a recess between two raised bearing surfaces spaced relative to the transfer surface of the trunnion for receiving debris removed from an area defined between one of the bearing surfaces and the transfer surface and holding grease to be delivered between the bearing surfaces and the transfer surface.

With specific reference to FIGS. 10A and 10B, the grease G flows into recess 98a. As shown, the recesses 98, including recess 98a, act as reservoirs for receiving and holding removed debris D and for storing and delivering the grease G as it is needed between the surfaces 95,96. From the recess 98a, the grease G continues or proceeds to flow to or toward an inlet 140a defined between a radial rounding section 130 of the bearing landing surface 95a and the load transfer surface 96. Debris D within the pocket 98a is held there as the grease G flows to the inlet 130 by a centrifugal force generated by rotation of the trunnion 97. When no centrifugal force is present, such as during non-rotation of the trunnion 97, the debris D in pocket 98a is prevented from "floating" out of the recess 98a as a result of the grease's high viscosity. The radius section 130 at the inlet 140a increases the flow rate of the grease G thereby increasing the pressure entering passage 141a to support the separation of the surfaces 95,96.

Figure 10C:
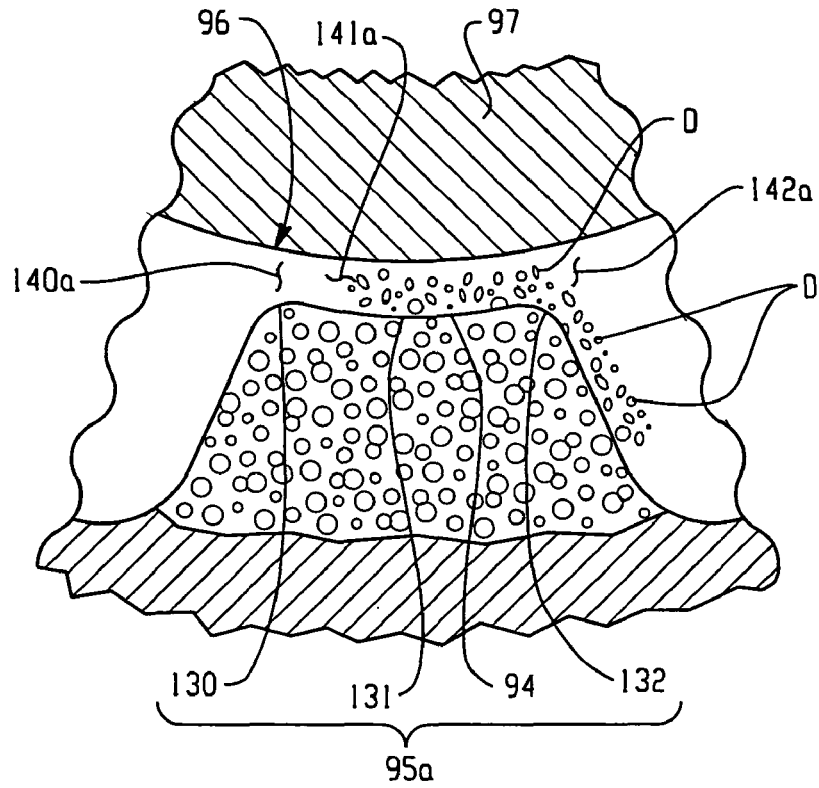
FIG. 10C is a partial enlarged view of the bearing member and trunnion of FIG. 7 showing debris being removed from the area defined between the bearing surface and the transfer surface.

With specific reference to FIG. 10C, the grease G continues through the passage or area 141a. Specifically, a Venturi Effect occurs at the inlet 140a to the area 141a between the landing 95a and the surface 96 which draws the grease G therein. The relatively rectangular section 131 assists in providing pressures that balance and support load pressures received through the load transfer surface 96. Laminar flow of the grease G is maintained or assisted by the inlet radius section 130 of the landing 95a but is subjected to its greatest load pressure in the areas between the landings 95 and the surface 96. As the grease G flows through this area, it engulfs debris or wear particles D and propels them toward an outlet 142a. Like the inlet 140a, the outlet 141b includes a radial rounding section 132 that maintains or assits in maintaining laminar flow of the grease G as it enters the recess 98b. The radius section 132 reduces the flowrate of the grease G as it exits the area 141a and enters recess 98b. The metallic wear particles or debris D can be seen growing larger in quantity as the flow of the grease G progresses toward the outlet 142a.

Figure 10D:
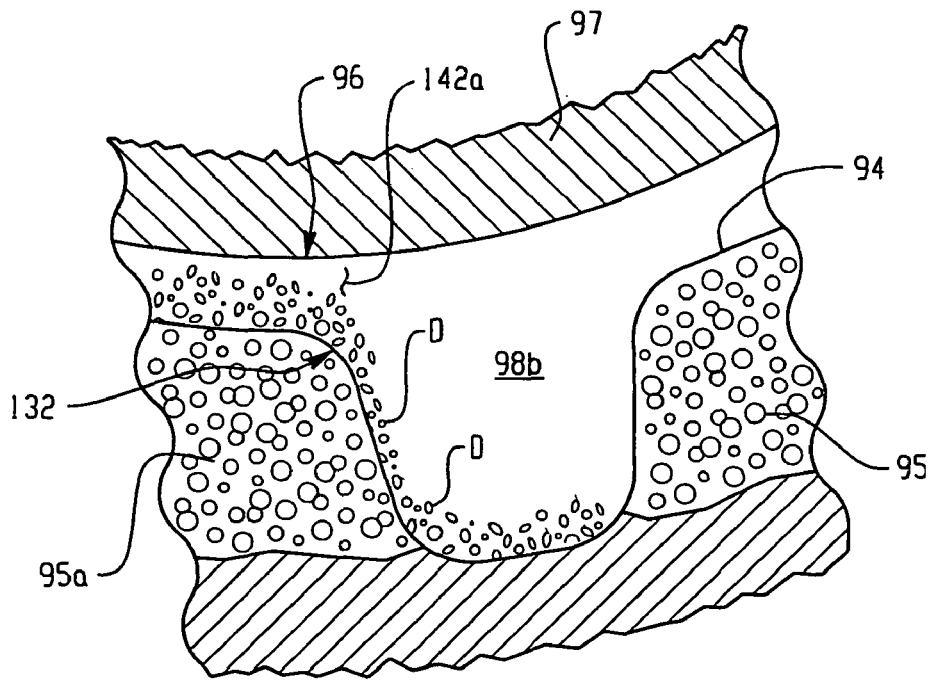
FIG. 10D is a partial enlarged view of the bearing member and trunnion of FIG. 7 showing debris flowing from the area defined between the bearing surface and the transfer surface to the recess immediately forward of said area.

Continuing, with additional reference to FIG. 10D, the grease G pulls debris D from the area 141a and flows into recess 98b wherein the pulled debris is deposited. Removed debris D is directed to the bottom of the recesses 98a,98b and remains there as a result of a centrifugal force created during rotation of the trunnion 97. The centrifugal force, which greatly exceeds the retention force of the grease's viscosity, draws the debris toward the bottom and left wall of the pocket, where it is essentially deposited. As already mentioned, even during non-rotational periods where no centrifugal force is present, the high viscosity of the grease G keeps the debris from "floating" off the bottom of the recesses 98.

The continuous removal of the debris D residing between the contacting surfaces 95,96 curtails their acceleration in growth of size and quantity and simultaneously limits the wear particles D trapped between the surfaces 95,96 to sizes typically below 10 microns. Particles below 10 microns are beneficial to rubbing or closely adjacent surfaces as such particles provide a polishing action. The removal of deleterious sized debris D (greater than 10-30 microns in diameter) and retention of benign sized wear particles (smaller than 10 microns in diameter) extends the operating life of the bearing assembly 87 beyond that of the prior art bearing assemblies.

The special calcogenide grease G augmented by the design shape of the bearing surface wall 94 eliminates or at least reduces the need for periodic maintenance grease replenishment. Periodic replenishment is eliminated or reduced because the removal of the debris eliminates or lessens debris from surface contact with the surfaces 95,96 which generates friction and thereby keeps the bearing assembly 87 operating temperature relatively low and keeps it from escalating to a point where it bakes out the oil based additive (grease base oil) in the grease rendering it less effective. It is the grease base oil blending with the solid calcogenide, lithium soap thickener and corrosion inhibitors which creates the grease G.

In the event heating occurs in the bearing assembly, such as may be caused by friction, and the grease base oil is "baked out", the impregnated bearing base oil is delivered to the grease G to replenish the grease base oil and thereby maintain its viscosity. With specific reference to FIG. 10A, an upper portion of the landing 95a is shown with pores 144, which are prevalent at least adjacent the landing 95a and can be prevalent throughout the entire bearing member 86. Heating expands the bearing base oil and introduces a capillary action which draws the bearing base oil from the pore reservoirs to the surface 95a where it blends with the grease G, if it is required. After the bearing assembly 87 cools, the bearing base oil returns into the metallic pores 144 of the bearing member 86. Through the use of the bearing base oil, periodic lubrication of the bearing assembly 87 is either completely avoided or at least needed less frequently.

Figure 11:
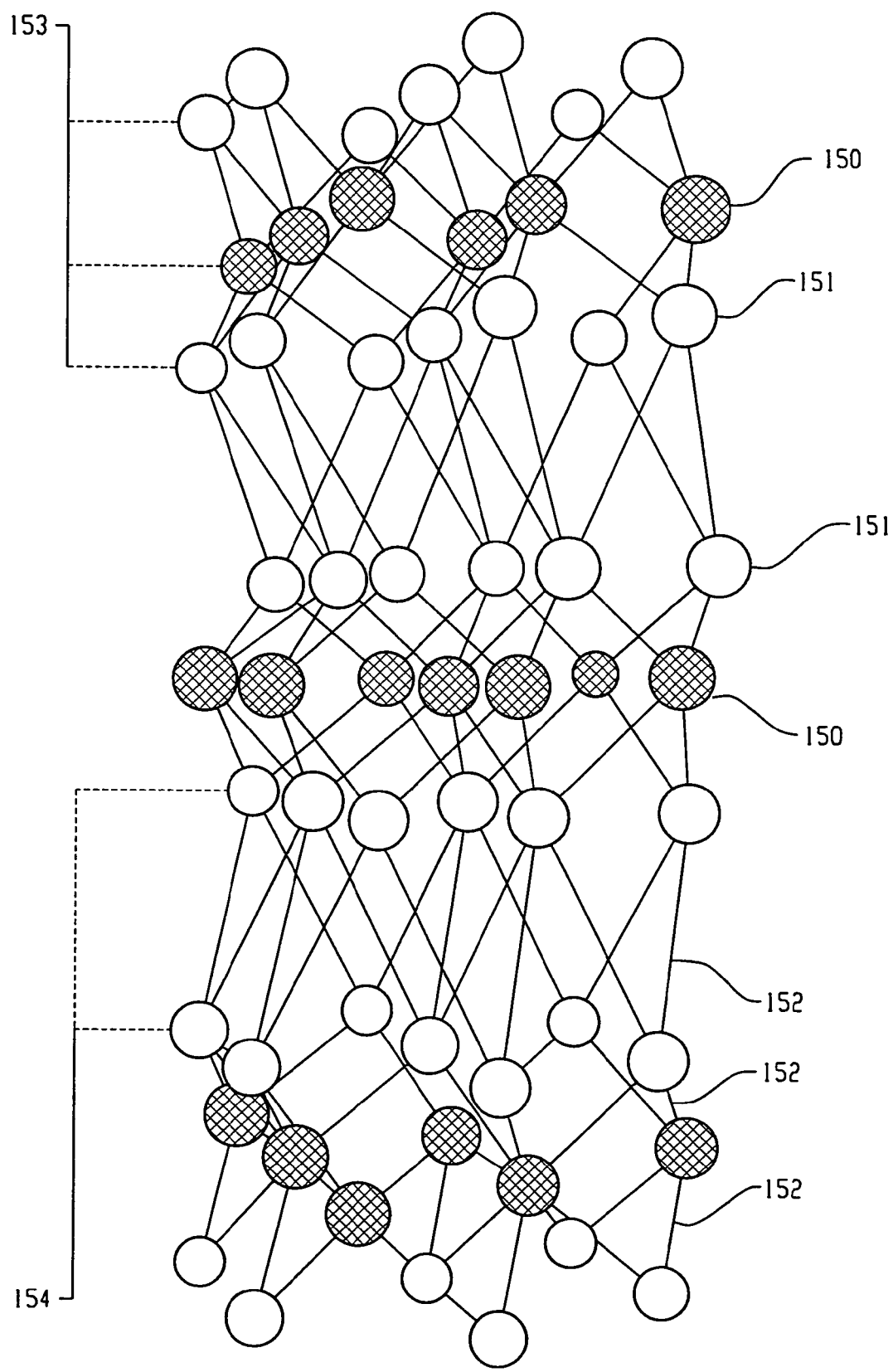
FIG. 11 is an exploded, atomic view of a solid grease used between the bearing member and an associated transfer surface according to a preferred embodiment of the present invention.

FIG. 11 is an enlarged, atomic view of the $MoS_2$ in the area 141a between the opposing surfaces 95 and 96 showing a calcogenide's, namely $MoS_2$'s, laminar planes. The filled-in atoms 150 represent molybdenum and the outlined atoms 151 represent Sulfur. The lines 152 represent the forces holding the atoms 150, 151 together. More particularly, the shorter lines represent strong covalent bonds and the longer lines represent weaker Van Der Waal forces.

Reference numeral 153 identifies two planes of Sulfur (S) tightly bonded to a plane of Molybdenum (Mo) atoms. Reference numeral 154 identifies the relatively weaker bond between two planes of Sulfur. As a result of these forces, the adjacent Sulfur atoms can readily slide over one another, while not effecting the covalent forces bonding the Mo plane. The structure of $MoS_2$ can be compared to a loaf of rye bread, where each slice has been buttered on both sides. The slice of bread is an Mo layer and the butter a layer of Sulfur. The butter portrays the action of the Sulfur rather accurately in that it sticks to the slice of bread, yet slides easily. The thickness of the laminar layer of $MoS_2$ is extremely small, so that a "stack" only 0.001 inches thick would have 40,000 "slices" (laminar layers).

The bearing assembly 87 enables the bearing 86 to operate at a PV value in the vicinity of 900,000, a factor of improvement of 18 over prior art bearings. The improvement is primarily a result of removing the debris before it can damage the bearing's surfaces and therefore adversely affect performance. Bearing assemblies constructed as described herein have operated for up to twenty four (24) days with temperatures remaining under 130 degrees Fahrenheit, at which time the tests were terminated. Thus, the operating temperature was well under the 450° F. drop point of the solid grease G.

The primary advantage in the use of the present invention is the superior operating performance it provides. The improved performance of the invention affords a number of additional advantages not found in prior art structures. Unit, direct labor, and capital equipment costs are significantly reduced, as well as service inventory, logistics, and maintenance costs. More specifically, unit material costs of the universal joint are reduced through the elimination of roller needles and the grease fitting. The original application of the grease is sufficient to last for an extended period and possibly for the life of the bearing member so that there is no need for a grease fitting to replenish the grease as is required in prior art. Cost reductions also result from the reduction in capital equipment required and in assembly labor necessary to make the bearing assembly 87, specifically, because there is no requirement to position a plurality of roller needles in the bearing member 86 prior to placement of the bearing member on the trunnion.

Figure 8:
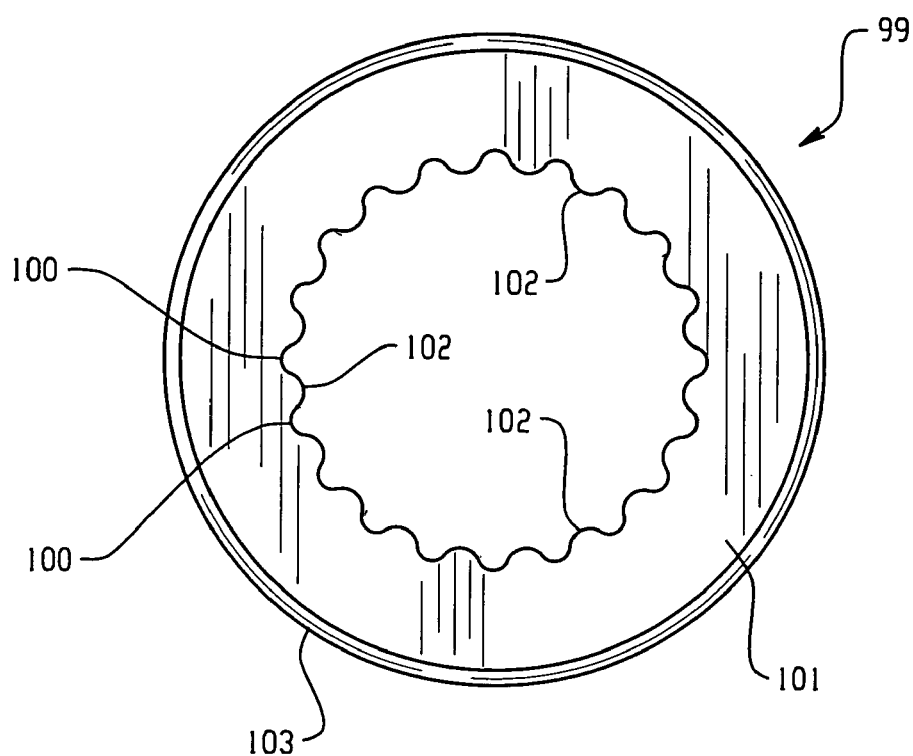
FIG. 8 is an end elevational view of a modified bearing member according to another preferred embodiment of the present invention.

The bearing surfaces 95 of this invention may alternately take many different forms and shapes depending upon design considerations. While in the preferred embodiment of the invention the bearing surfaces 95 are shown as being essentially semi-trapezoidal in cross-section so as to approximate the profile of adjacent roller needles, it should be appreciated that other bearing member landing and pocket shapes may be used within the spirit of this invention. The bearing surfaces 95 and 96 of this invention may provide for a wide variety of contact points and contact areas including, but not limited to, line contact, point-to-point contact, line to-cylinder-contact, cylinder-to-cylinder contact, spherical contact, pyramidal contact, planar area-to-planar area contact, to name a few. For example, an alternate embodiment of the bearing member for use in this invention is shown in FIG. 8. In FIG. 8, the bearing cup 99 is provided with a plurality of spaced, essentially semi-circular pockets (recesses) 100 in the sidewall 101 of the cup which are joined together by means of semicircular bearing surfaces 102. It should be understood that utilization of powder metallurgy techniques permits the fabrication of many surface design configurations and shapes, thereby permitting essentially any theoretically or empirically determined structured bearing shapes from convex to concave.

Figure 9:
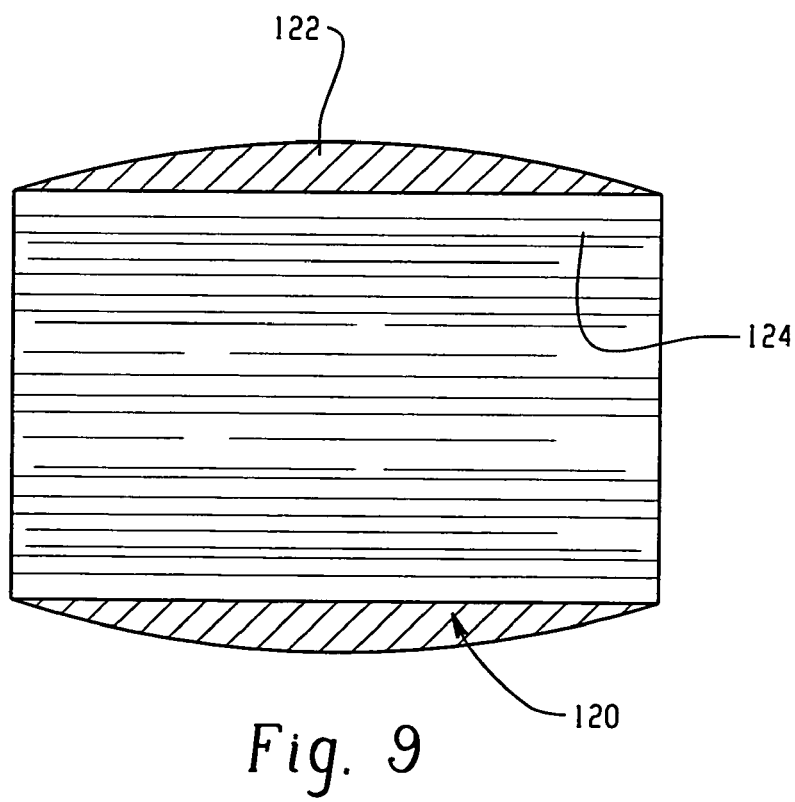
FIG. 9 is a side elevational view, partly in section, of another modified bearing member according to yet another preferred embodiment of the present invention.

FIG. 9 shows a bearing cup of this invention of the through type (sleeve). The bearing sleeve of FIG. 9, thus, has application in transfer devices such as that shown in FIG. 5. The bearing sleeve of FIG. 9 is a through cup 120 having a convex external surface 122 which is adapted to be received within the housing 84 of FIG. 5 to make contact with the housing transfer surface 83. The internal wall of the bearing cup of FIG. 9 includes a plurality of bearing surfaces 124 which are of the type shown in FIGS. 6, 7 and 8. That is to say, the bearing surfaces 124 of the through cup of FIG. 9 are generally semi circular or semi-trapezoidal in cross-section and approximate the profile of the plurality of needles.

The invention has been described with reference to several preferred embodiments. Obviously, modifications and alterations will occur to others upon reading and understanding the preceding detailed description. It is intended that the invention be construed as including all such modifications and alterations as come within the scope of the appended claims on the equivalents thereof.

The invention claimed is:

1. A bearing assembly, comprising:
   a rotatable hub defining a load transfer surface;
   a porous bearing surrounding and movable relative to said hub, said bearing including bearing surfaces extending radially toward said hub;
   a grease disposed between said porous bearing and said hub, said grease including a grease base oil and functioning as a lubricant between said hub and said bearing, said grease generally maintaining separation between said transfer surface and said bearing surfaces while simultaneously removing debris from an area defined between one of said bearing surfaces and said transfer surface; and
   a bearing base oil impregnated in said porous bearing and substantially similar to said grease base oil for replenishing said grease base oil as said grease base oil is depleted.

2. A bearing assembly, comprising:
   a rotatable hub defining a load transfer surface;
   a bearing surrounding and movable relative to said hub, said bearing including bearing surfaces extending radially toward said hub;
   a grease disposed between said hub and said bearing, said grease functioning as a lubricant between said hub and said bearing that generally maintains separation between said transfer surface and said bearing surfaces while simultaneously removing debris from between one of said bearing surfaces and said transfer surface.

3. The bearing assembly of claim 2 wherein said grease includes a calcogenide component.

4. The bearing assembly of claim 3 wherein said grease includes Molybdenum disulfide, a Lithium thickened complex soap and a mid-range viscosity grade base oil.

5. The bearing assembly of claim 2 wherein said bearing includes at least a partially porous portion adjacent said bearing surfaces and impregnated with an oil.

6. The bearing assembly of claim 5 wherein said bearing is formed by powdered materials techniques.

7. The bearing assembly of claim 5 wherein said grease includes a grease base oil that substantially matches said base oil impregnated in said bearing so that said grease base oil is replenished with said impregnated base oil as said grease base oil is depleted and said bearing is heated.

8. The bearing assembly of claim 5 wherein said partially porous portion has a density between about 5 and about 7.5.

9. The bearing assembly of claim 8 wherein said partially porous portion has a density between about 6.5 and about 7.2.

10. The bearing assembly of claim 9 wherein said partially porous portion has a density between about 6.8 and about 7.2.

11. The bearing assembly of claim 10 wherein said partially porous portion has a density of about 7.

12. The bearing assembly of claim 2 wherein said bearing surfaces are raised landings separated by recesses.

13. The bearing assembly of claim 12 wherein said bearing is a cup having a cylindrical outer surface, a closed end and an inner surface, said raised recesses extending radially into said inner surface.

14. The bearing assembly of claim 12 wherein said landing surfaces are one of semi-trapezoidal in cross-section and semi-circular in cross-section.

15. The bearing assembly of claim 13 wherein said cylindrical outer surface includes:
   a first outer surface adjacent said closed end having a first diameter;
   a second outer surface axially spaced from said closed end having a second diameter that is less than said first diameter;
   a tapered surface connecting said first outer surface to said second outer surface; and
   a lead taper defined adjacent a distal end of said second outer surface.

16. The bearing assembly of claim 2 wherein said bearing is formed of at least a ferrous compound, a nickel compound and a carbon compound.

17. The bearing assembly of claim 2 wherein said rotatable hub is one of a plurality of trunnions of a universal joint, said universal joint including a driving yoke fixed to a driving shaft and a driven yoke fixed to a driven shaft, said bearing having an external wall fixed to a respective yoke.

18. A bearing assembly, comprising:
   a rotatable hub defining a load transfer surface;
   a porous bearing surrounding and movable relative to said hub, said bearing including bearing surfaces extending radially toward said hub;
   a pressure resistant grease disposed between said porous bearing and said hub; said grease comprising a grease base oil for lubricating movement between said bearing surfaces and said load transfer surface; and
   a bearing base oil impregnated in said porous bearing and substantially similar to said grease base oil for replenishing said grease base oil as said grease base oil is depleted.

19. The bearing assembly of claim 18 wherein said grease removes debris from an area between said bearing surfaces and said transfer surface.

20. The bearing assembly of claim 18 wherein said grease further comprises a calcogenide.

21. The bearing assembly of claim 20 wherein said calcogenide is molybdenum disulfide and said grease further comprises a Lithium thickened complex soap.

22. The bearing assembly of claim 18 wherein said grease base oil and said bearing base oil are ISO 200-400 viscosity grade paraffinic base oil.

23. The bearing assembly of claim 18 wherein said bearing surfaces are raised landings integrally formed with a cylindrical sidewall of said porous bearing and generally having a generally semi-circular cross-sectional shape.

24. The bearing assembly of claim 23 wherein recesses are defined between said raised landings and said recesses have a generally semi-circular cross-sectional shape.

25. A universal joint, comprising:
- a driving shaft having a driving yoke;
- a driven shaft having a driven yoke;
- a cross member and a plurality of bearing members interconnecting said driving yoke and said driven yoke, each of said bearing members connected to a respective one of said yokes, said cross members provided with a plurality of trunnions and one of said plurality bearing member provided for each of said plurality of trunnions, each trunnion and associated bearing form a bearing assembly including:
- a transfer surface defined on said trunnion that is surrounded by said bearing member, and
- said bearing member including a plurality of bearing surfaces which are integral therewith, said bearing surfaces making bearing contact with said transfer surface through a film of relatively incompressible grease, said bearing surfaces and said grease facilitate removal of debris between said bearing surfaces and said transfer surface by maintaining a flow of said grease across said surfaces by rotation of said transfer surface.

* * * * *